Nov. 8, 1949

JEAN ESTOUP,
SO-CALLED HENRI ESTOUP 2,487,118

TELEGRAPH KEYBOARD TRANSMITTER

Filed Feb. 3, 1947

Nov. 8, 1949
JEAN ESTOUP,
SO-CALLED HENRI ESTOUP
2,487,118
TELEGRAPH KEYBOARD TRANSMITTER
Filed Feb. 3, 1947
3 Sheets-Sheet 3
Fig.3
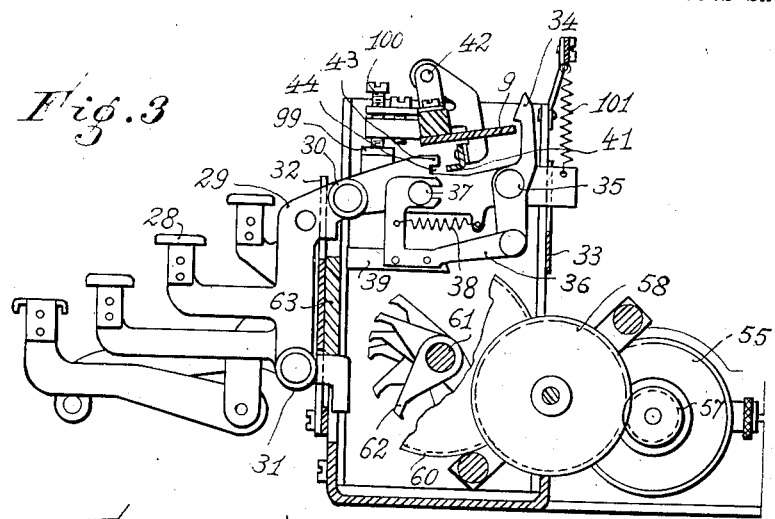
Fig.4
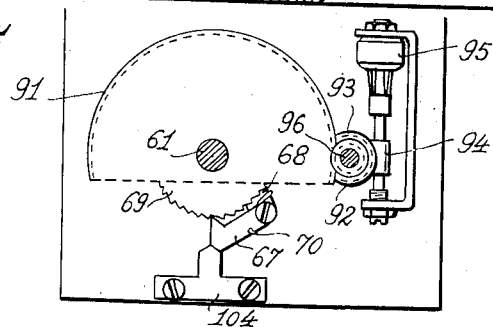
Fig.5
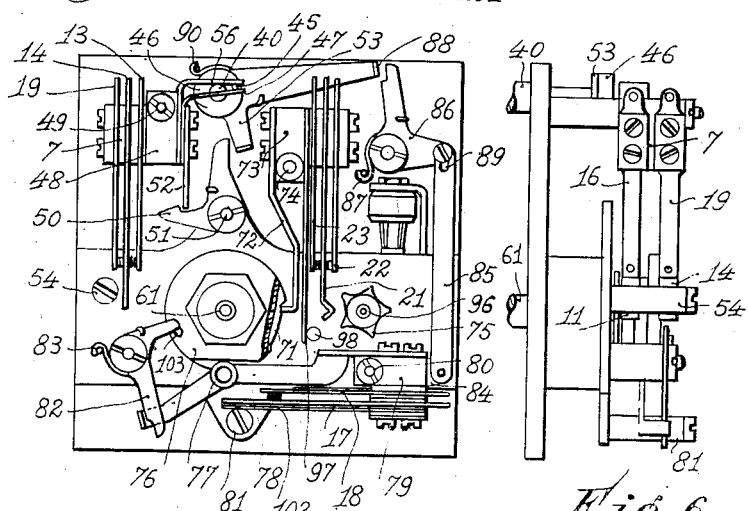
Fig.6
Inventor
Jean Estoup so-called Henri Estoup
By
Attorneys Patented Nov. 8, 1949

2,487,118

UNITED STATES PATENT OFFICE 2,487,118

TELEGRAPH KEYBOARD TRANSMITTER

Jean Estoup, so-called Henri Estoup, Sceaux, France, assignor to Mecanique et Transmission Metran, Paris, France, a corporation of France Application February 3, 1947, Serial No. 726,125
In France June 15, 1945

Section 1, Public Law 690, August 8, 1946
Patent expires June 15, 1965

8 Claims. (Cl. 178—79)

The present invention relates to telegraphic devices of the so-called "impulse metering" type, which transmit and receive each character, figure or punctuation signs by means of a combination formed by a predetermined number of equal to each other and rapidly succeeding current alternations, followed by a long reestablishment of the rest current.

The object of the invention is of constituting a transmitting apparatus operated by means of a key-base sender similar to the key-board of the type-writing machines.

The constitution of a key-base sender, enabling to spare time and to avoid fatigue with respect to the known type of perforated disc sender similar to the call dial of automatic telephone involves particular psycho-technical difficulties. Indeed, since the time required for the transmission is different from one character to another, the manipulation of the said apparatus becomes irregular if it is desired to use them to the maximum range of construction. It results that some characters rapidly succeed to each other whilst long time intervals are comprised between other groups of characters. Consequently, the operator has a mind to depress too early a key corresponding to a character which is following another character the transmission having a long lasting time, or on the contrary, to release too early a key, as occurs, particularly, in transmitting devices wherein the contacts-actuating shaft rotates continuously in the same direction. To minimize those defects, it has been suggested to separate the transmission of two successive characters by a predetermined interval of silence; this has proved insufficient in practice, however.

In order to remedy the defects above, and to make sure that the transmission be correct, whatever the movements of the operator, the main object of the invention is the provision of a step-by-step telegraphic transmitter in which each key actuates the transmitter only when fully depressed; in which transmission takes place after a fully depressed key, whether or not said key is maintained depressed; in which, during transmission of a character corresponding to a pressed key, no other key is active to interfere with this transmission; in which a key maintained depressed beyond the transmission time cannot inititate a repeat transmission.

Another object of the invention is the provision of a step-by-step telegraphic transmitter of the character described in which sensorial indications (tactile and audible) are transmitted to the operator as a warning of his movements, termination and of their usefulness, whereby he may operate the transmitter at the maximum speed allowed by the electrical characteristics.

Another object of the invention provides, in a telegraphic transmitter of the character described, a manipulating shaft driven alternately in one and the other direction and associated with an axial shaft, said shaft actuating the transmitting contacts through a gear train cooperating with a clutch, allowing the driving of the axial shaft by the manipulating shaft in one direction only of said last shaft, and with a regulator maintaining constant the speed of said shaft, the reversing of the rotational direction thereof being obtained by fingers helically mounted thereon and striking a member integral with the depressed key, the corresponding character to be transmitted and, thereafter actuating a current reversing device.

Another object of the invention is the provision, in a step-by-step telegraphic transmitter of the character described, of means operable by the depression of a key to prevent the simultaneous operation of two keys, of one key as long as the manipulating shaft has not attained its starting position, after a predetermined time at the end of the transmission, and to prevent a character repeat should a key be held depressed when the shaft has reached this starting position.

Another object of the invention is the provision, in a step-by-step telegraphic transmitter of the character described, of means to lower the current intensity energizing the motor which drives the transmitting shaft through the manipulating shaft.

The order, or frequency, of the characters, letters, ciphers, etc. is naturally disposed in the most convenient manner and does not form a part of the invention.

The invention also consists in other secondary features which will hereafter be more fully described. It will anyhow be well understood with the help of the following disclosure and of the accompanying drawing which is a diagram chiefly given by way of example. In the said drawing:

Fig. 3 shows the key mechanism;

Fig. 4 shows the regulation mechanism;

Fig. 5 shows the contacting mechanism;

Figure 1:
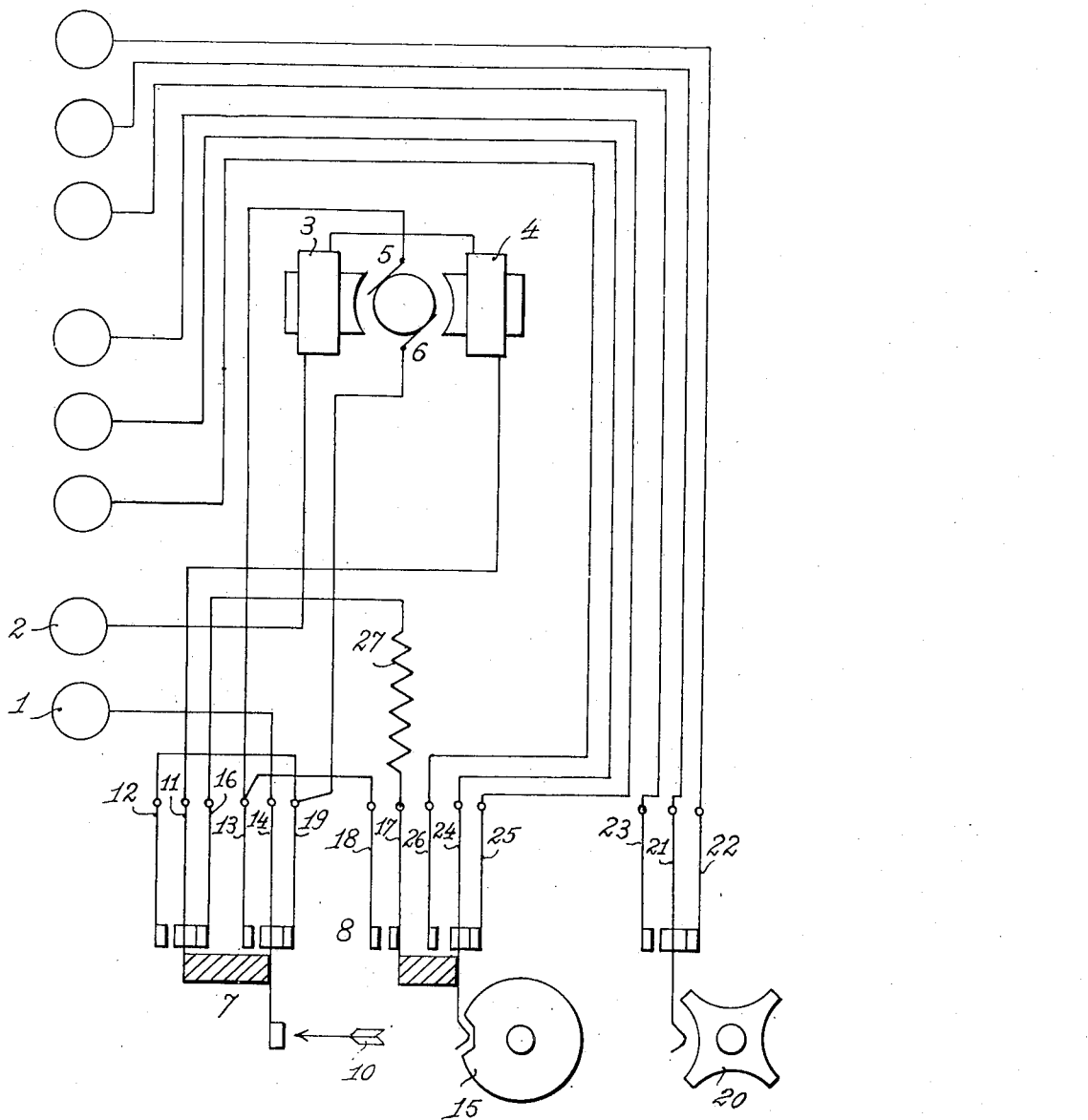
Fig. 1 is a diagram of connections of the apparatus.
Figure 2:
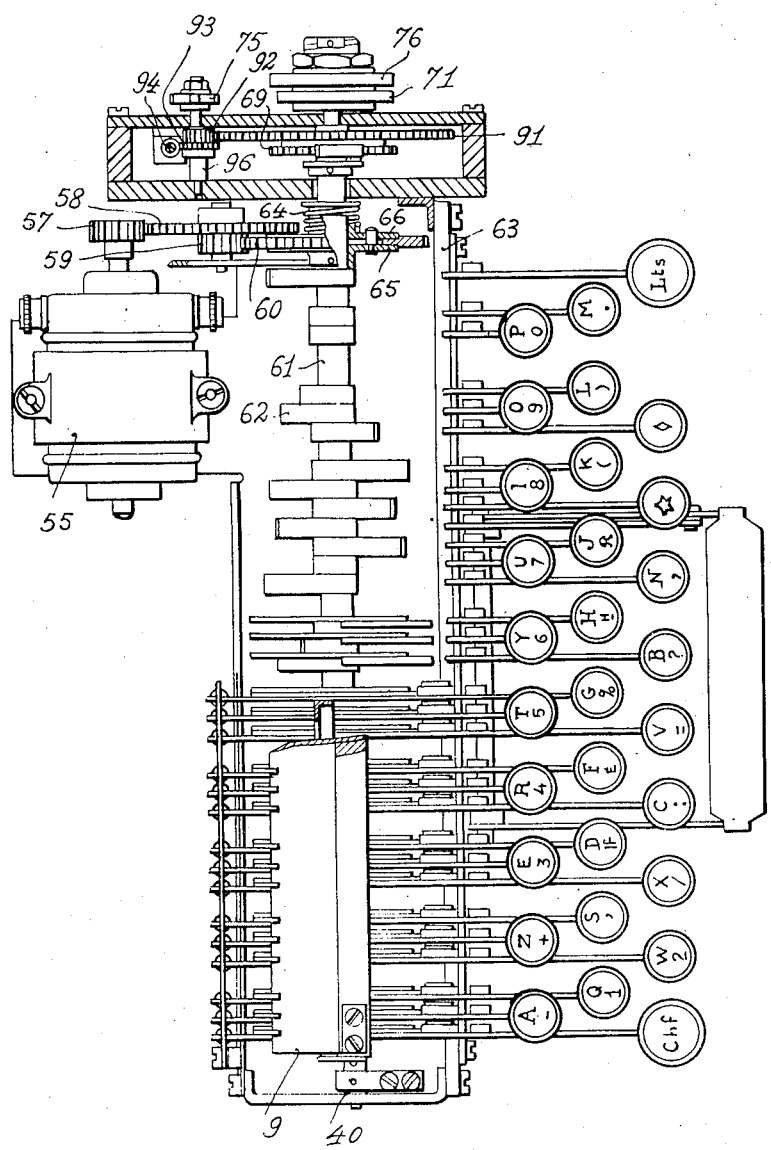
Fig. 2 shows the arrangement of the assembly of the key-base sender.

Fig. 6 view sideways shows the motor reversing device,

*Electrical operation of the apparatus.*—The apparatus is operated by the electric current from the network fed in by the terminals 1 and 2, and which may be, according to local conditions, either a continuous or alternating current. The current flows through a motor of series wound type, diagrammatically shown by its field coils 3 and 4, its rotor and its brushes 5 and 6. The current is supplied through a set of reversing contacts 7 and of a guard contact 8. The set of reversing contacts is operated by a starting universal bar 9 (Figs. 2 and 3). When the said bar is lowered in depressing a key, according to a mechanism that will be further described, the reverser 7 is urged in the direction of the arrow 10. It sets up the current in the motor through the circuit 2, 3, 4, 11, 12, 6, 5, 13, 14, 1, in such a way that the motor will start for winding up the transmitting mechanism. The cam 15, driven by the latter, makes up the contact of the rest rupturing device 8; when the universal bar 9 is lifted, the reverser 7 comes again back into the position of rest, the current flows through the motor by the circuit 2, 3, 4, 11, 16, 17, 18, 13, 5, 6, 19, 14, 1. The respective feeding of the field windings and of the armature of the motor are consequently reversed and the motor is revolving backwards, thus driving the transmitting cam 20 which by causing the oscillations of the blade 21 between both blades 22 and 23 respectively connected to the + and − poles of the transmitting cell, is transmitting a train of reversals. When the transmitting mechanism is returning at rest, the cam 15 is breaking the contact 17—18 and interrupting the feeding of the motor. At the same time, a contact 24—25 is established, a contact 24—26 being cut out, the said set of three contacts being employable for operating a commutation between the "transmitting" position and the "receiving" position, as is well known in the printing apparatus for long distance of the "starting-stopping" type.

An ohmic resistance 27 enables to reduce the intensity of the current which flows through the motor during the return stroke. The forward stroke is consequently performed under the full power of the motor with the maximum rapidity, whilst the backward stroke, slowed down by the regulation, is performed under a reduced power and with reduced heating.

*Mechanical operation.—Depression of a Key.*—If it is supposed that a key 28 (Fig. 3), for instance, is lowered, driving with it the key-lever 29, the latter, by rolling through both its rollers 30 and 31 upon the front guiding plate 32, is vertically displaced. It is guided in the said displacement by two slots formed into the front guiding plate 32 and by an aperture formed into the rear guiding plate 33.

The lever 29 is provided with a hook 34 pivotable about the pivot 35 and carrying itself a member 36 longitudinally slidable upon the foot 37. A light spring 38 is constantly urging back the member 36 towards the foot 37. A stop 39 is secured upon the member 36.

In being lowered, the hook 34 drives the universal bar 9 which, being carried by an axis 40, is revolving in clockwise direction—the said direction being shown with respect to the illustrated figure. This remark is applicable in all the cases in which such direction will be given. The axis 40 is also supporting a locking universal bar 41 pivotable about two pivots such as 42 and urged back in clockwise direction by means of a light spring (not shown). When the lever 29 is depressed, the universal bar 41 bears upon the nose 43 of the lever 29. By the end of the stroke, the universal bar 41 falls above the nose 43 thus locking in lowered position the key being depressed. At the same time the universal bar 41 is penetrating into the slots 44 of the undepressed levers preventing any untimely depression of any of them. Since the hook 34 is maintaining lowered the universal bar 9, by being itself kept depressed by the universal bar 41, the starting mechanism cannot be released by itself and keeps the said position during all the winding motion of the transmitting device. The operator can consequently release each key as soon as he strikes it, as in the typewriting machines, without awaiting for the reaction of the transmitting device.

At the same time, the axis 40 (Fig. 5), by means of a stud 45, carried by a ring 46, is displacing the blade spring 47, secured to the block 48 which is carrying the whole of the contacts 12, 11, 16, 13, 14 and 19 and pivotable about the pivot 49. However, a hook 50, pivotable about a pivot 51 and retaining the blade 52, prevents the block from revolving. By the end of the stroke of the universal bar 9 a member 53, carried by the ring 46, is bearing upon the tail of the hook 50 and, in releasing the blade 52 suddenly drops the block 48. The blades 11 and 14, bearing upon the insulated foot 54 are reversing the rotor connections and starting the motor 55 as stated above. A back-blade 56 is restraining the depression of the reversing contacts.

At the end of the depression of a key 28, the corresponding abutment 39 is consequently lowered, the lever which carries the same being held depressed, all the other keys of the keyboard being locked in lifted position and the forward contact of the motor 55 being established at the end of the stroke by a sudden reversal. The apparatus is adjusted in order that the starting release of the motor will take place after the fall of the universal bar 41. The operator is thus sure that his further manipulation will not have as a consequence of troubling the transmission and he can consequently release the key that he was just striking.

*Forward action of the sender.*—The motor 55 (Figs. 2 and 3) drives through the pinions and gear wheels 57, 58, 59 and 60 the key-axis 61 in counter-clockwise rotation. The manipulating axis 61 is provided, opposite to each abutment such as 39, with a stud such as 62, of such size that each abutment 39 will be arranged above the path of the corresponding stud when the lever which is carrying it is in its highest position and upon the said path when the latter is being depressed.

Consequently, if it is assumed that a key is depressed and that motor 55 is started, the manipulating axis is rapidly revolving in counter-clockwise direction until the corresponding stud 62 is engaging the depressed abutment 39. The said abutment is thrown against the stop-plate 63 and the key-axis 61 is locked.

At that time, the motor 55 is revolving at high speed. In order to render the impact less abrupt and to avoid the rebounding effects that would result, the wheel 60 is not rigidly connected to the key-axis 61; it is clamped by the spring 64 between both end-plates 65 and 66 rigidly connected to the key-axis 61. When the key-axis 61 is stopped by the abutment 39, a sliding motion takes place between the wheel 60 and the end-plates 65 and 66, thus restraining the stress exerted by the motor 55 upon the stud 62 and destroying by its friction its inertia.

The stopping impact of the key-axis is however still strong and would be liable to endanger the strength of the mechanism if it was transmitted through a pivot. It should be noted that it is only supported by the abutment 39 bearing against the stop plate 63 without the help of pivotings of the hook mechanism 34.

During the forward stroke of the key-axis 61 (Fig. 4), the pawl 67, carried by the arm 68 integral with the manipulating axis 61 is jumping over the teeth of the ratchet 69 towards which it is urged back by means of the light spring 70. At the same time, the lost time cam 71 (Fig. 5), acting upon the lever 72, is revolving the block 73 which is pivoting about the axis 74 and bringing the transmission contact holder blades 21, 22, 23, in order to draw the central blade 21 closer to the transmitting cam 75, which is then in the state of rest.

Also at the same time, the commutation cam 76 urges back the roller 77, carried by the lever 78, and rocks the block 79 which is pivoting about the axis 80, in order to press the blades 24 (not shown) and 17 upon the insulated support 81. The contact 24—25 is broken and the contacts 24—26 and 17—18 are established. The same motion of the commutation cam and of the lever 78 allows the hook 82 to fall under the action of the spring 83. Finally, under the displacement of the arm 84, secured upon the block 79, the rod 85 allows the hook 86 to drop under the action of the spring 87 upon the end 88 of the lever 53. The said lever, when depressed, is preventing the fall. An elongated hole 89 enables the hook 86 to slightly bear against the end 88 of the lever 53.

*Return motion of the key-axis and transmission.*—At the same time as the abutment 39 is striking the stop plate 63, the hook 34 is pivoting about the pivot 35 and then releases the universal bar 9 whose axis 40 is pivoting under the action of a spring 90. The universal bar 9 is coming back at rest, also carrying in position of rest the motor reverser carried by the block 48. The motor 55 is consequently fed in order to revolve in a direction opposite to the forward motion direction, and is rotating in clockwise direction the key-axis 61. The pawl 70 (Fig. 4) is engaging one tooth of the ratchet 69 which is driving the wheel 91, the pinion 92, the worm wheel 93 and the worm 94, which is carrying a centrifugal governor 95. The return action is thus performed at a regular rate.

Upon the axis 96 of the pinion 92 is secured the transmitting cam 75 which, by acting upon the blade 21, is causing the emission of alternations the number of which, determined by the angular position of the stud 62 upon the key-axis 61, is defining the manipulated character. After performing the transmission, the arm 72 being urged back by the spring 97 which is bearing upon the stud 98 and meeting a cam portion of smaller diameter of the lost time cam 71, is spaced from the transmitting cam 75 which is ending its motion without causing other current alternations. The time thus lost is determined as known, in order to allow the translator to perform the printing of the corresponding character and the return at rest of the translating axis.

During the return stroke, the member 53 being pivoted in order that the universal bar 9 is lifted in resting position, the hook 86 falls under the end 88 and opposes to any new displacement of the member 53 and consequently of the universal bar 9. Consequently if the operator is depressing a new key, the latter, being held by the stay of its hook 34 upon the universal bar 9, will not be able to be lowered. The return motion at rest of the key-axis 61 will not be liable to be interrupted neither by an untimely reversal of the motor reverser 7 nor by an untimely lowering of an abutment 39 which could come into the path of the corresponding stud 62.

Besides, the hook 34 of the depressed key having released the universal bar 9, any further keeping of the said key in the depressed position cannot act for causing a new departure. The latter cannot take place if the operator wants to strike again the hook 34 above the universal bar 9 and striking once more the key.

In order to ascertain that all the hooks such as 34 are in resting position above the universal bar 9, the ascending motion of the same is restrained by an abutment 99 upon which is bearing an adjusting screw 100.

As stated above, the operator can release each key as soon as struck. If no special provision was taken, the universal bar 9 being released at the time of the engagement of the abutment 39 with the stud 62 and consequently driving the universal bar 41 which is unlocking the key-lever 29, the latter urged back by its spring 101 could escape and allow the key-axis to continue its motion. In order to avoid the said disadvantage, the stud 62 and the abutment 39 comprise in their engaging parts two oblique cuttings. The stud 62 thus engaged the abutment 39 as long as it is pressing against it and releases it only when it begins its backward stroke.

If the operator is depressing two keys at the same time, the stud 62 corresponding to the key which has less impulses to transmit is engaged by its abutment 39 and displaces its hook 34 for releasing the universal starting bar 9. But the hook 34 corresponding to the other key remains in place and maintains depressed the universal bar 9; consequently the backward motion cannot be produced and the motor remains fed for the forward direction. In order to enable the operator of releasing the key-board, a push-button operated by a special key (not shown) is pressing upon the universal locking bar 41 and releasing the lever carrying the key that has the greater number of impulses to transmit. The universal bar 9 can thus rise again and the apparatus is transmitting the combination corresponding to the key which comprises the smaller number of impulses.

*Return at rest.*—A few moments after the return in the position of rest, the roller 77 is meeting the descending slope of the commutation cam 76. The lever 78 is lifted under the action of a step-back spring 102, but it meets the hook 82, which holds it against further motion in maintaining on the one hand the feeding of the motor 55, and on the other hand the locking of the bar 53 by the hook 86, as long as a finger 103 secured upon the commutation cam 76, did not release the hook 82. At that time, the lever 78 is suddenly falling, breaking the contact 17—18, operating the commutation transmission-reception upon the contacts 24, 25 and 26 and pulling back the hook 86.

At the same time, the pawl 67 is bearing upon a locking abutment 104, which stops the assembly 91—96 in a perfectly determined position, and such that the transmitting cam 75 will bring a recess in front of the blade 21.

If it is assumed that during the backward stroke following to a key operation, the operator is depressing a new key prepared in order that no time be lost, the universal bar 9, then released, is lowered, the motor reverser is operating and a new transmission is immediately taking place. The lowering of the key thus caused by the release of the bar 53 makes the operator aware that his operation is accomplished and that he can raise his finger after having fully depressed the corresponding key. The time keeping statement thus given is perfectly clear, the instant at which he is again allowed to press upon a new key is shown to him by the noise produced by the strike of the finger corresponding to the key he has just depressed upon its abutment and, by this means, upon the stop plate 63. The operation of the keys at the maximum speed of the apparatus is consequently the following: the operator is lowering a key, waits for the noise of stopping of the key-axis, presses against the next key until it is lowered, lifts his finger as soon as the end of the stroke is reached, waits again for the noise of the stopping of the key axis, presses upon the following key, and so on. The rhythm thus obtained is perfectly clear notwithstanding its irregularity and does not involve any time losing.

The invention is not at all restrained to the embodiment just described, on the contrary, it comprises all the modifications thereof.

What I claim as my invention and desire to secure by Letters Patent is:

1. A step-by-step telegraphic transmitter comprising a manipulating shaft, means for driving said shaft, a plurality of fingers disposed helically on said shaft, keys representing the characters to be transmitted, members driven respectively by each of said keys and arranged for separately and one at a time co-operating with the driving means for driving the shaft in a given direction and, thereafter, co-operating respectively with each of the fingers to stop the shaft rotation in the given direction, means for inverting the action of the driving means on the shaft when same is at rest after having revolved in said given direction, a transmitting shaft, means on the manipulating shaft for driving the transmitting shaft at a constant speed above the manipulating shaft when same revolves in a direction reverse to the given speed, transmitting contacts, means on the transmitting shaft to actuate the contacts for transmitting a number of impulses corresponding to the angular offsetting of the finger corresponding to the operated key, a determined number of impulses being transmitted at each revolution of the transmitting shaft, and means for arresting said manipulating shaft driving means when said shaft reaches its position of rest after having rotated in said reverse direction.

2. A step-by-step telegraphic transmitter according to claim 1, in which the manipulating shaft drives the transmitting shaft by means of a gear train and a clutch adapted to render a gear train operative only when the shaft revolves in the reverse direction.

3. A step-by-step telegraphic transmitter comprising a manipulating shaft, an electric motor for driving said shaft, a plurality of fingers disposed helically on said shaft on an arc equal at its maximum to 360°, keys representing the characters to be transmitted and adapted to be depressed, members respectively driven by the depressing of the keys and disposed so that each, when its corresponding key is lowered, energizes successively the motor in a given direction to drive the shaft also in a given direction and co-operate with one of the fingers for stopping the shaft rotation after it has described an arc equal to the angular displacement thereof from a position of rest, means for inverting the current feed to the motor when the shaft stops after rotation in the given direction, so as to drive the shaft in the reverse direction, a transmitting axis, means for driving the axis from the shaft at a regular speed above that of the shaft when same revolves in a direction reverse to that of the given direction, transmitting contacts, means on said axis for actuating the contacts so as to transmit a number of impulses corresponding to the key depressed, a determined number of impulses being transmitted each revolution of the shaft, and means for cutting off the motor current when the shaft reaches its rest position after revolving in said reverse direction.

4. A step-by-step telegraphic transmitter, as claimed in claim 3, in which the driving means of the transmitting axis from the manipulating shaft comprises a large diameter toothed wheel freely mounted on the shaft, a lever secured to said shaft, a pawl pivoted to the end of said lever, a ratchet wheel integral with the toothed wheel, said wheel having teeth such that the pawl is engaged when the shaft rotates in the reverse direction and freed when the shaft revolves in the given direction, a small wheel on the axis having two sets of teeth, one of which meshes with the large wheel, an endless screw meshing with the other set of teeth of the small wheel, and a centrifugal regulator connected to said endless screw.

5. A transmitter according to claim 3, comprising means for disconnecting the motor from the shaft when same is stopped after having revolved in the given direction, for preventing shock when the shaft stops, and means connected with the axis driving means to arrest the contacts actuating means in a constant position when the shaft reaches its starting position after having revolved in the reverse direction.

6. Transmitter according to claim 3, comprising first means on the shaft for operating the motor current-reversing means at the end of the shaft rotation in the given direction, second means on said shaft for bringing the contacts near their actuating means at the end of rotation of the shaft in the given direction, and third means also on the shaft for displacing the contacts from their actuating means for a predetermined time before the shaft, revolving in the reverse direction, is stopped.

7. A transmitter according to claim 3, comprising means actuated by depressing a key for preventing the simultaneous operation of two keys, the operation of another key as long as the shaft is away from its rest position after having revolved in the reverse direction, and a repeat transmission should a key be held down during the cycle of two successive rotations of the shaft.

8. A step-by-step telegraphic transmitter, comprising a manipulating shaft, means for driving said shaft, keys representing the different characters to be transmitted, a transmitting axis connectable to said shaft by a gear train and a clutch for effecting said connection solely in a determined rotational direction of the shaft and rotate said axis at a regular speed above that of the shaft, transmitting contacts, means on the axis for actuating the contacts when the axis revolves, means for allowing successively: the driving of the shaft for a predetermined period of rotation in a direction reverse to the initially determined direction, the stopping of the shaft and the driving thereof and the axis for another predetermined period of rotation in the determined direction, said last predetermined period being a multiple of the first for all keys, and means for arresting the action of said contacts-actuating means for a predetermined time before the return of the shaft and axis to their starting positions.

JEAN ESTOUP, SO-CALLED HENRI ESTOUP.

REFERENCES CITED

The following references are of record in the file of this patent:

UNITED STATES PATENTS

| Number | Name | Date |
|---|---|---|
| 2,215,802 | Thompson et al. | Sept. 24, 1940 |